Jan. 11, 1944.　　W. I. GLADFELTER ET AL　　2,339,008
COATING MACHINE
Filed Nov. 27, 1940　　9 Sheets-Sheet 3

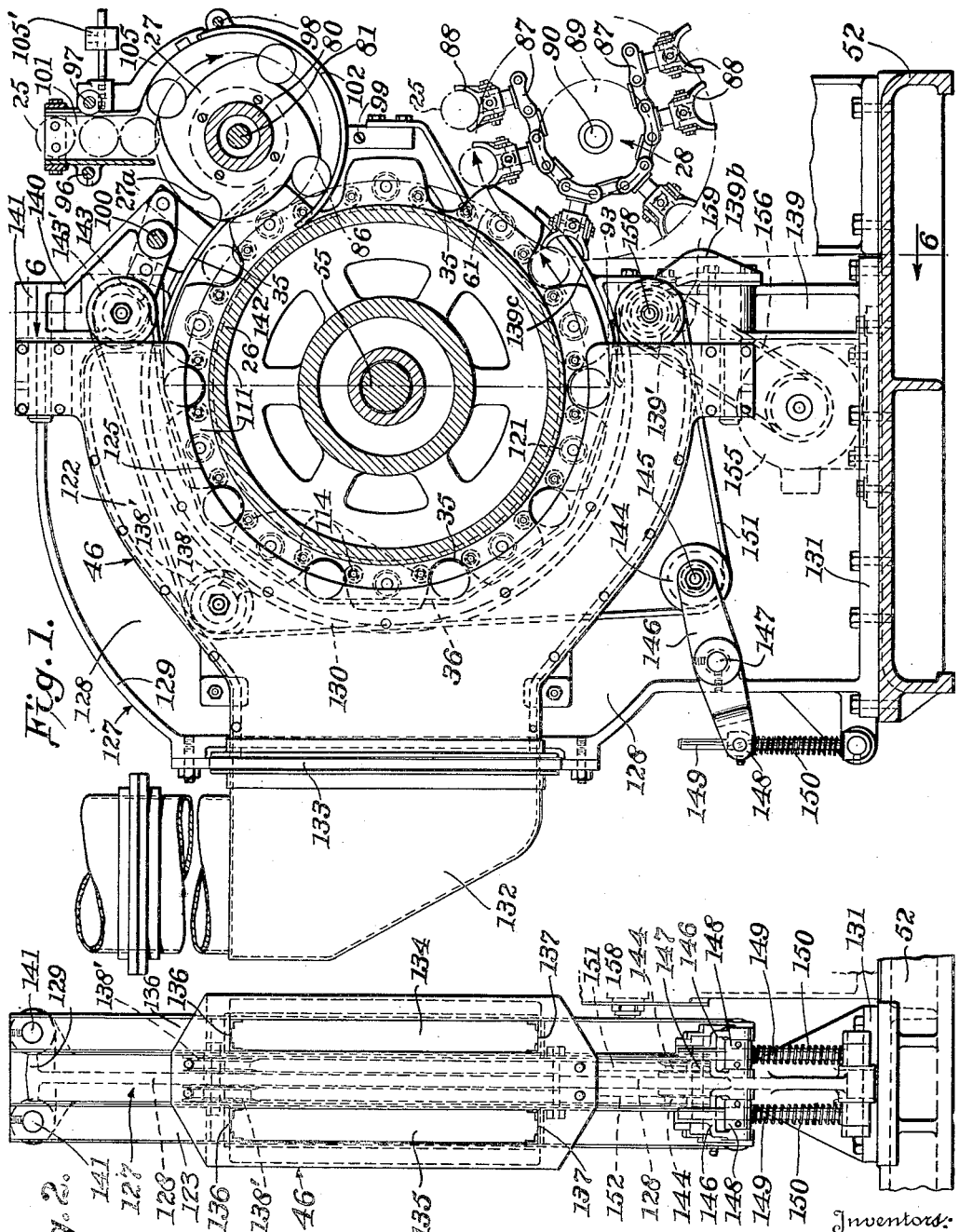

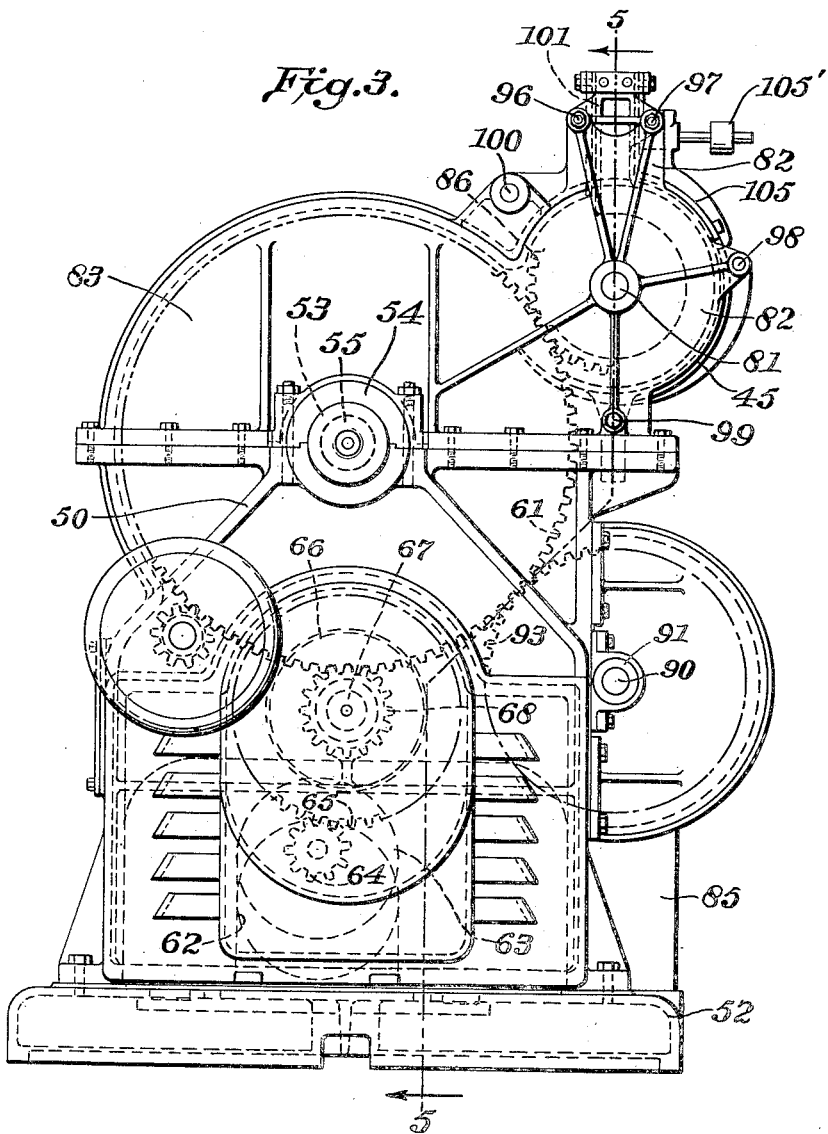

Inventors:
Wiltie I. Gladfelter,
Walter A. Ehrlich,
By Cushman Darby Cushman
Attorneys.

Jan. 11, 1944. W. I. GLADFELTER ET AL 2,339,008
COATING MACHINE
Filed Nov. 27, 1940 9 Sheets-Sheet 5

Inventors:
Willie I. Gladfelter,
Walter A. Ehrlich,
By
Attorneys.

Jan. 11, 1944. W. I. GLADFELTER ET AL 2,339,008
COATING MACHINE
Filed Nov. 27, 1940 9 Sheets-Sheet 6
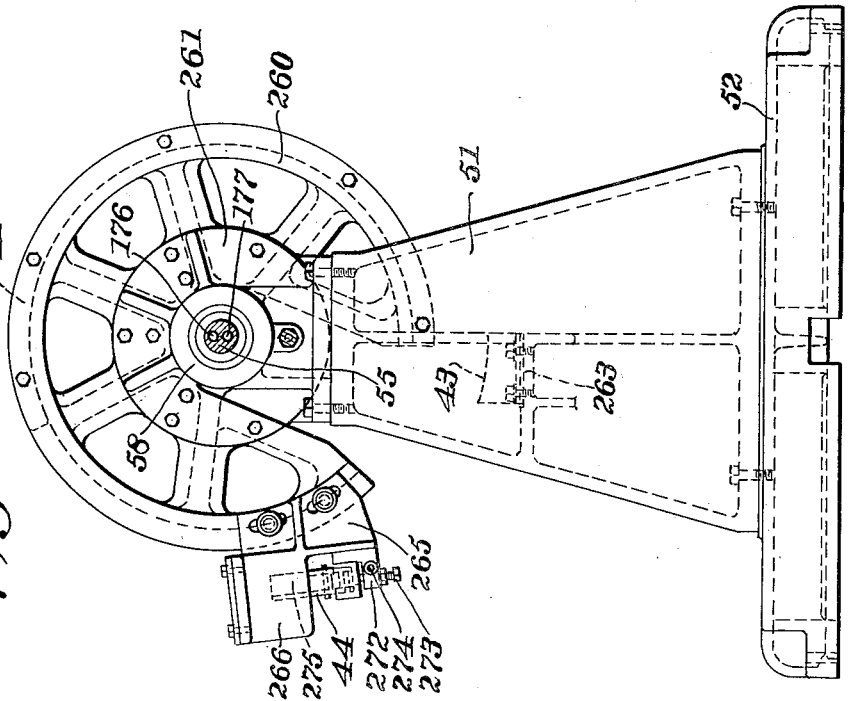
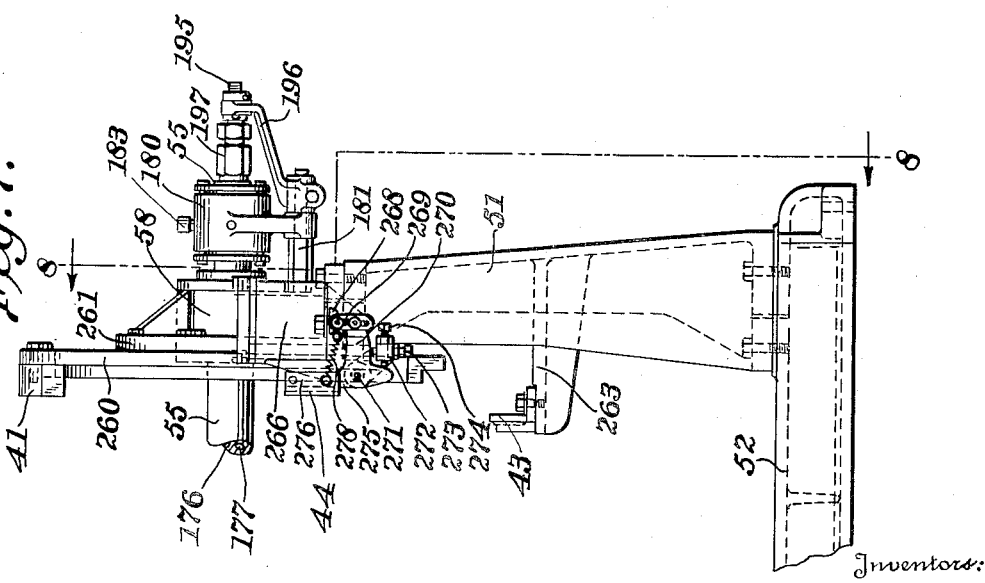
Inventors:
Wiltie I. Gladfelter,
Walter A. Ehrlich,
By Cushman Darby Cushman
Attorneys.

Inventors:
Wiltie I. Gladfelter, &
Walter A. Ehrlich,

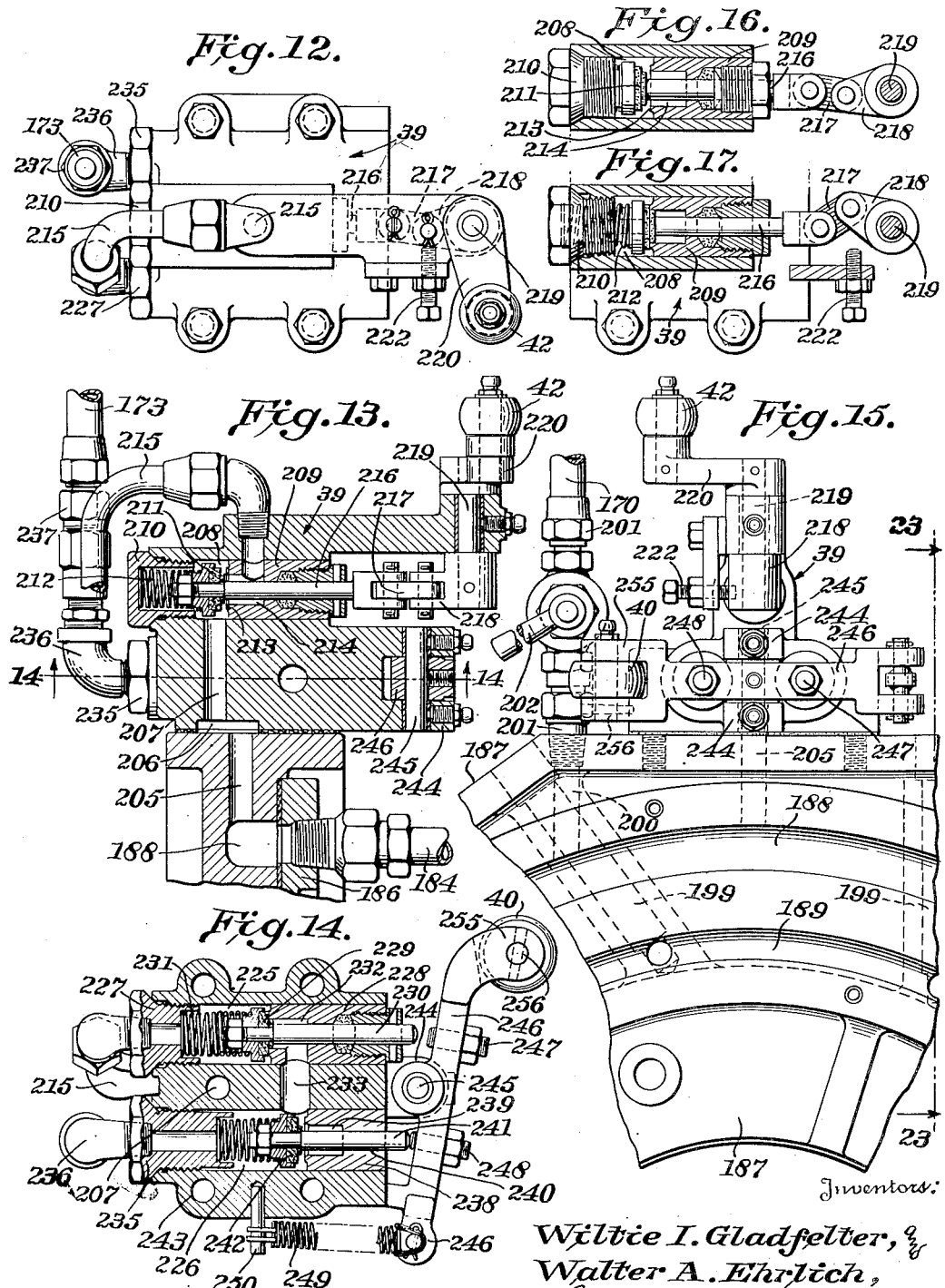

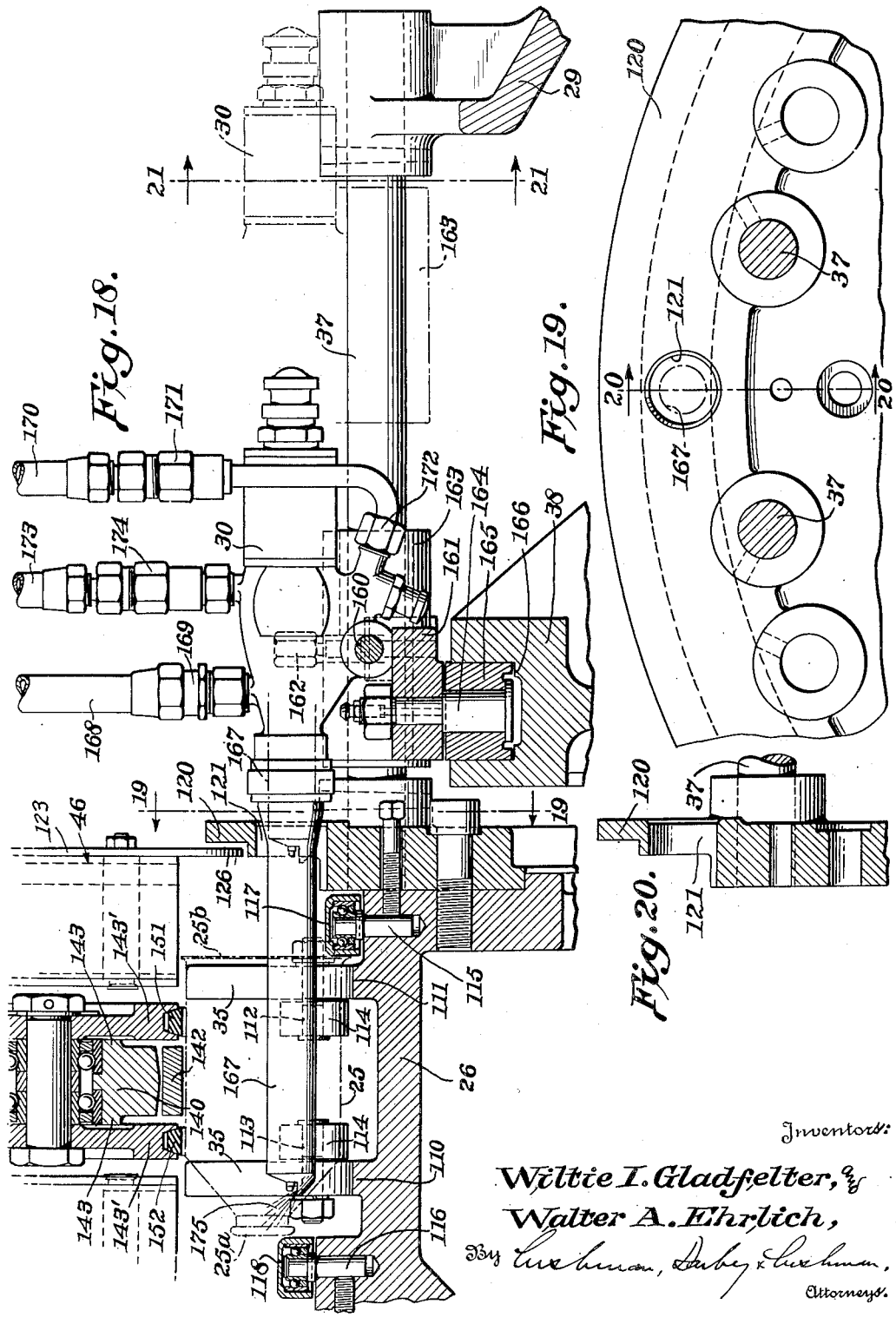

Patented Jan. 11, 1944

2,339,008

UNITED STATES PATENT OFFICE 2,339,008

COATING MACHINE

Wiltie I. Gladfelter and Walter A. Ehrlich, Philadelphia, Pa., assignors to Crown Cork & Seal Company, Inc., Baltimore, Md., a corporation of New York Application November 27, 1940, Serial No. 367,454

26 Claims. (Cl. 91—45)

This invention relates to machines for coating articles, such as containers or cans, with a liquid coating material. More particularly, the invention relates to means for coating the interiors of such articles during the course of their manufacture.

It is an object of the invention to provide a machine that will handle the containers in a can-making line, keep pace with other machines in that line and effectively coat the interiors of the containers with a smooth, even, and continuous layer of coating material.

It is a further object of the invention to provide, in a machine of this class, improved article-handling instrumentalities, including improved infeed devices, improved can-supporting and rotating means, and improved outfeed devices, adapted to convey the articles to the next machine in the line or to a coating material baking oven or drying chamber.

A further object of the invention is to provide improved means for coating the interiors of the containers, and, more particularly, an improved arrangement of spray guns adapted to be projected into the interiors of the containers, to spray the inner surfaces thereof, as the containers are moved along a predetermined path and are rotated about their axes.

Another object is to provide novel and more effective control devices for the spray guns, to control their normal spraying operations and, in addition, to render the guns ineffective to project coating material, in the event that containers are not present in operative, spray-receiving position relative thereto.

A further object of the invention is to provide novel means for housing or enclosing the containers during the time they are subjected to the spraying operation, to prevent the indiscriminant projection of coating material in the vicinity of the machine and upon various moving parts hereof. To this end, the invention provides novel means for moving the spray guns from an external area, inwardly into the enclosed area through a relatively small aperture or space, whereby the escape of atomized coating material or spray from the enclosed space is substantially prevented.

Another object of the invention is to provide improved means for delivering liquid coating material and air under pressure from suitable sources to the movably mounted spray guns and to provide, in the air line, improved control valves for the guns.

The invention of the present application is an improvement on and relates to a modification of the coating machine shown and described in the application of Goebel and Rau, Serial No. 154,108, filed July 16, 1937. One of the principal advantages of the present machine, over that shown in the aforesaid application, is that, in accordance with the present invention, the containers, as they are moved through a coating zone are substantially completely enclosed in a hood or housing, whereby the escape of coating material or spray from that zone is prevented, making it impossible for such material to foul the various moving parts of the machine, such as the drive, the operating cams, the cam following devices and the like.

Another advantage of the present machine, and one that has a direct bearing on the problem of enclosing the coating zone, is the provision of means, positioned outside of and in advance of the coating zone for detecting the absence of a can in the line and for rendering inoperative the gun that normally would coat a can in that relative position in the line. The present invention also provides improved means, controlled by that detector or can feeler for moving the gun controlling valves to inoperative position when no can is present.

Other objects and advantages of the invention will become apparent to those skilled in the art from a consideration of the following description of the illustrative embodiment of the invention shown in the accompanying drawings.

In the drawings:

Figure 1 is a vertical transverse section and partial elevation of the machine.

Figure 2 is a side elevation of the hood and associated parts, taken from the left of Figure 1.

Figure 3 is an end elevation looking in the same direction as Figure 1, with the hood and associated parts removed.

Figure 7 is a side elevation of the supporting pedestal and associated parts, shown at the right in Figure 6.

Figure 8 is an end elevation and partial section.

taken from the right of Figure 7, on line 8—8 thereof.

Figure 9:
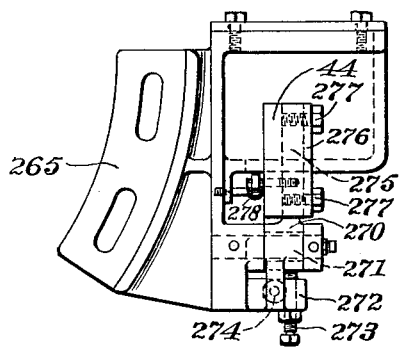

Figure 9 is an elevation of a movable cam assembly.

Figure 10:
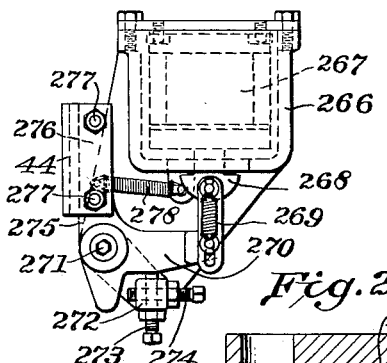

Figure 10 is a similar view taken from the right of Figure 9.

Figure 11:
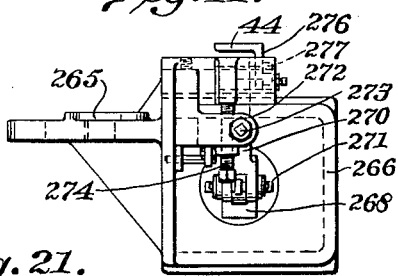

Figure 11 is an inverted plan, taken from the bottom of Figure 9.

Figure 12 is an plan of a control valve assembly, with certain parts removed.

Figure 13 is a central vertical section through the assembly of Figure 12.

Figure 14 is a section taken on line 14—14 of Figure 13.

Figure 15 is an elevation, taken from the right of Figure 13, and showing a portion of the air and coating material distributing ring exposed.

Figures 16 and 17 show one of the valves of the valve assembly in two different positions.

Figure 18 is a vertical section, with certain parts in elevation, showing one of the spraying assemblies and associated parts.

Figure 19 is a fragmentary section and elevation taken on line 19—19 of Figure 18.

Figure 20 is a section on line 20—20 of Figure 19.

Figure 21:
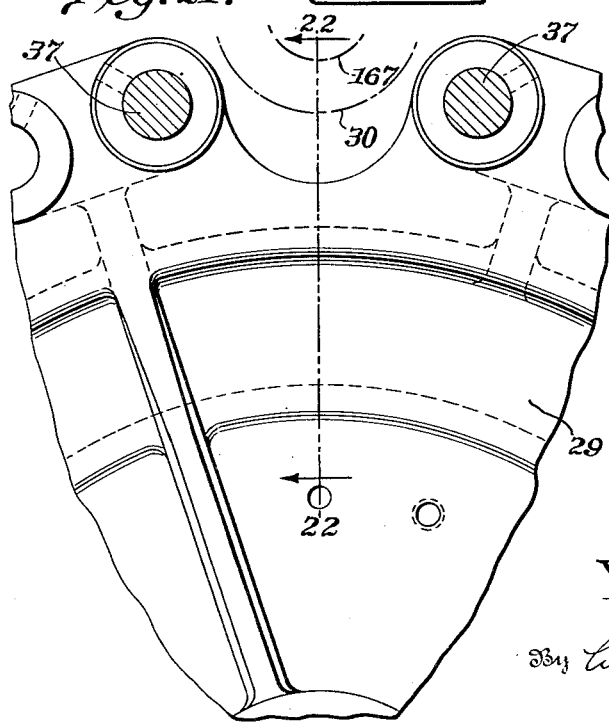

Figure 21 is a fragmentary elevation and section of the gun supporting turret, taken on line 21—21 of Figure 18.

Figure 22:
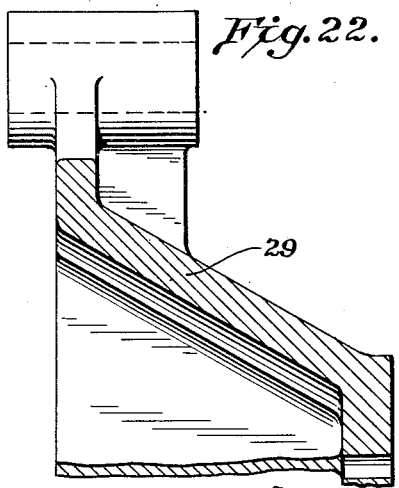

Figure 22 is a section on line 22—22 of Figure 21, and

Figure 23:
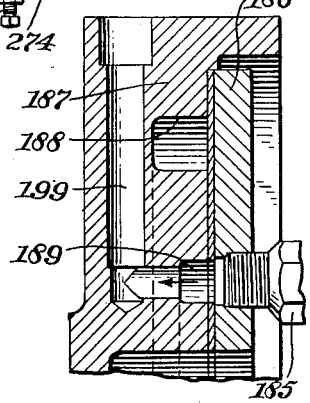

Figure 23 is a section through the distributor ring, showing one of the coating material delivery passages, the section being taken on a plane similar to that indicated at 23—23 in Figure 15.

General description

In the illustrative example of the invention shown in the accompanying drawings, the machine is adapted to interiorly coat container bodies 25 of the type shown in the application of Calleson and Calleson, Serial No. 334,876, filed May 13, 1940. Of course, the invention is not limited to operation upon such articles, since the machine will coat any similar containers or the like.

The containers 25 are preferably in partially formed condition, in that they comprise drawn seamless bodies terminating in conical upper ends and necks, each provided with a crown finish 25a, while their lower ends are open and are defined by outwardly projecting seaming flanges 25b, adapted, at a subsequent stage in the manufacturing operation, to have bottom end members double-seamed thereon.

Referring to Figures 1-6, the machine comprising a can-holding turret 26, mounted for rotation about a horizontal axis, an infeed dial 27 adapted to deliver cans to the turret, an outfeed assembly 28 adapted to take the coated containers therefrom, a spray gun supporting turret 29, rotatable with the first turret and having spray guns 30 supported thereon, means for rotating the turrets and the infeed and outfeed devices in unison and for moving the guns axially and automatically controlling their operations. The cans supported for rotation in pockets 35 in the periphery of the turret 26, are rotated about their own axes by frictional contact with belt means 36 trained for movement along a path following the path of movement of the cans and also serving to hold the cans in the pockets as they move along underneath the turret.

The spray guns 30 are slidably mounted upon a plurality of pairs of rods 37 which extend between and interconnect the can turret 26 and the gun turret 29, the axial, sliding movement of the guns being controlled by a stationary cam 38, positioned between the two turrets. A plurality of gun-controlling valve assemblies 39, one for each gun, are supported for rotation with the gun turret, to control the delivery of operating air to the guns. Each valve assembly includes a normal air flow controling valve and a cam follower 40 adapted to actuate the same, the follower being disposed in engagement with a stationary cam 41 adjacent the path of rotation of the assemblies. As the turrets rotate, in the normal manner, the guns are successively rendered operative by the cam followers 40 engaging the raised portions of the cam 41 as the containers pass through the spray zone.

In addition, each valve assembly 39 includes an auxiliary air flow control valve which is normally open, but which may be closed by automatic means, if no can is present in position to enter the pocket 35 associated with the particular gun. This auxiliary valve is actuated by a toggle mechanism, hereinafter described, which may be shifted to the valve opening and valve closing positions by a cam follower 42 positioned to engage a fixed cam 43 and, in certain cases, a movable cam 44 (Figs. 7 and 8). In the preferred arrangement, the stationary cam 43 shifts each toggle mechanism to valve opening position as the followers 42 move therepast. The movable cam 44, positioned behind the stationary cam 43 and in advance of the spraying zone, is adapted to be projected into the path of movement of the followers 42, to shift the toggles to the valve closing position when no cans are in position to be sprayed, the position of the movable cam being controlled by a can feeler 45 positioned adjacent the path of movement of the cans and serving to control an electric circuit which operates a cam moving solenoid, as described in detail below.

A portion of the periphery of the can holding drum 26 is enclosed by a hood 46, through which the cans move as they receive the spray from the guns 30. Since the cans and the can-receiving pockets are substantially enclosed by the hood, the liquid coating material is confined therein and is prevented from being deposited on other parts of the machine.

Supporting and driving means

At opposite ends of the machine, there are two upwardly projecting supporting frames 50, 51, mounted upon a base 52. The frame 50, at the left end of the machine, supports an elongated, longitudinally projecting sleeve 53, clamped thereon against rotation by a cap 54. A main shaft 55 is journaled at its left end and at an intermediate point in bearings 56, 57, carried by the sleeve 53. At its other end (Figure 6) the shaft is journaled in a bearing 58, carried by the supporting frame 51. Thus, the shaft 55 is supported for rotation about a horizontal axis.

The turret 26 is mounted for rotation upon bearings 59 disposed exteriorly of the sleeve 53, while the turret 29 is keyed to the shaft 55 for rotation therewith. As pointed out above, the two turrets are interconnected for rotation in unison by the rods 37, upon which the guns 30 are mounted. The stationary cam 38, it should be noted, is rigidly supported upon the inner end of the stationary sleeve 53, by bolts 60 or the like.

The turret 26 carries, at its left end (Figure 6), a large spur gear 61 of a radius substantially equal to the distance between the centers of the cans in the pockets and the axis of rotation of the turret. The base 52 of the machine (Figure 5) supports an electric motor 62, connected through a reduction gear 63 to a driving pinion 64 in mesh with a spur gear 65. The latter gear is connected through an air clutch 66 to a counter-shaft 67 having another spur gear 68 on its inner end, in mesh with the large gear 61 carried by the turret 26. Since the air clutch 66 may be of conventional construction, it need not be described in detail. So long as air under pressure is delivered to the clutch by air line 69, a driving relation is established from the gear 65 through the clutch housing and friction discs therein to the shaft 67 to rotate the latter. Adjacent its inner end (Figures 4 and 5), the shaft 67 carries a brake drum 70, embraced by brake shoes 71, 72, the former having an extension providing an air cylinder 73. A piston 74 slidably mounted therein is connected by a stem 75 to an extension 76 of the other shoe, while rod 77, carried by the cylinder 73, extends through an aperture therein and is drawn downwardly by a heavy compression spring 78, tending at all times, to apply the brake. However, air under pressure delivered to the cylinder 73 by line 79 drives the piston downwardly and separates the shoes. Preferably, the flow of air to the clutch 66 through the line 69 and to the brake through the line 79, is simultaneously controlled so that, when air is admitted, the clutch is engaged and the brake is released. When the air pressure is relieved the clutch is disengaged and the brake applied.

The infeed dial 27 is carried by a sleeve 80, journaled for rotation upon a shaft 81 carried at one end by a gear casing constituting a lateral extension 82 of the main casing 83 for the upper half gear 61. The other end of the shaft 81 is supported at the upper end of a bracket 84 carried by a pedestal 85 supported on the base 52. A spur gear 86 within the casing 82, fixed to the sleeve 80 and disposed in mesh with the gear 61, imparts rotation to the infeed dial at substantially the same peripheral speed as the turret 26.

Although a conventional outfeed dial may be employed, the construction shown, somewhat diagrammatically in Figure 1 is preferred. A chain 87 having a plurality of can-receiving brackets 88 supported thereon is trained for movement about a sprocket 89 fast on a shaft 90 secured in bearings 91, 92 carried respectively by the frame 50 and the pedestal 85. A spur gear 93 on the shaft 90 is disposed in mesh with the large gear 61, the radius of the gear 93 being substantially equal to the distance between the centers of the brackets 88 and the center of the shaft 90, whereby as the brackets approach the pockets on the turret, they move at the same peripheral speed. The chain 87 is preferably trained for movement upwardly on an inclined path and leads to and through a flange spray coating machine, for instance, of the type shown in the application of Gladfelter and Moore, Serial No. 365,698, filed November 14, 1940. For a specific description of the chain, the can supporting brackets and the like, reference is made to that application.

The infeed dial 27 is disposed between the gear casing 82 and a plate casting 95, carried by the shaft 81 and connected to the casing by transverse rods 96, 97, 98, 99 and 100. The rods 96, 97 support a vertically disposed chute section 101, adapted to register with a conveyor chute, not shown, so as to lead the cans in a vertical line downwardly to the pockets 27a of a dial. The rods 98 and 99 support fixed arcuate guides 102, 103 and 104, for the sides and ends of the cans moving in the pockets 27a of the dial, the inner end of the side wall guide 102 being disposed to permit the cans to enter the turret pockets and be received therein.

A movable guide 105, adjacent the entrance end of the infeed dial assembly, is pivoted on the rod 97, so that the guide may swing upwardly and outwardly in the event of a jam at that point.

The can feeler 45, which constitutes a guide pivoted on the rod 98, lies alongside of the bottom guide 102 and is urged upwardly by a spring 106. In the absence of a can in the pocket 27a opposite the feeler 45, therefore, the latter will move upwardly. In such case, a bolt 108 carried by a laterally projecting boss 107 will contact a button associated with a switch 109 thereby closing a circuit, for purposes hereinafter described. A similar bolt 108' carried by the upper movable guide 105 maintains a switch 109' normally closed. The guide 105 is urged downwardly by an adjustable weight 105'. The switch 109' is in an electric circuit which includes a solenoid, connected to valve means in the lines leading to the air clutch 66 and the brake 70, to the end that, when the guide 105 is raised, for instance, on the occurrence of a jam at the entrance of the dial, the circuit will be opened and the solenoid deenergized, to shift the valve means to deliver air through the pipe 79 to the brake piston, to apply the brake, and to exhaust air from the line 69 to disengage the clutch. Since such solenoid-operated air valves are well understood in the art, none is shown herein.

*The can receiving pockets*

The peripheral rim of the main turret (Figures 6 and 18) is provided with a pair of outwardly projecting flanges 110, 111 having depressions or cut-out portions therein forming pockets 35 for the containers. Adjacent the pockets, the flanges carry pairs of pins or bolts 112, 113, upon which rollers 114 are journalled for rotation on axes parallel to the turret axis, four rollers being provided for each pocket. The rim of the turret 26, at opposite ends of the pockets carries radially disposed pins 115, 116, upon which rollers 117, 118 are journalled, the rollers being adapted to engage, respectively, the seaming flanges 25b and the neck ends 25a of the containers supported for rotation upon the rollers 114 in the pockets.

Figure 4:
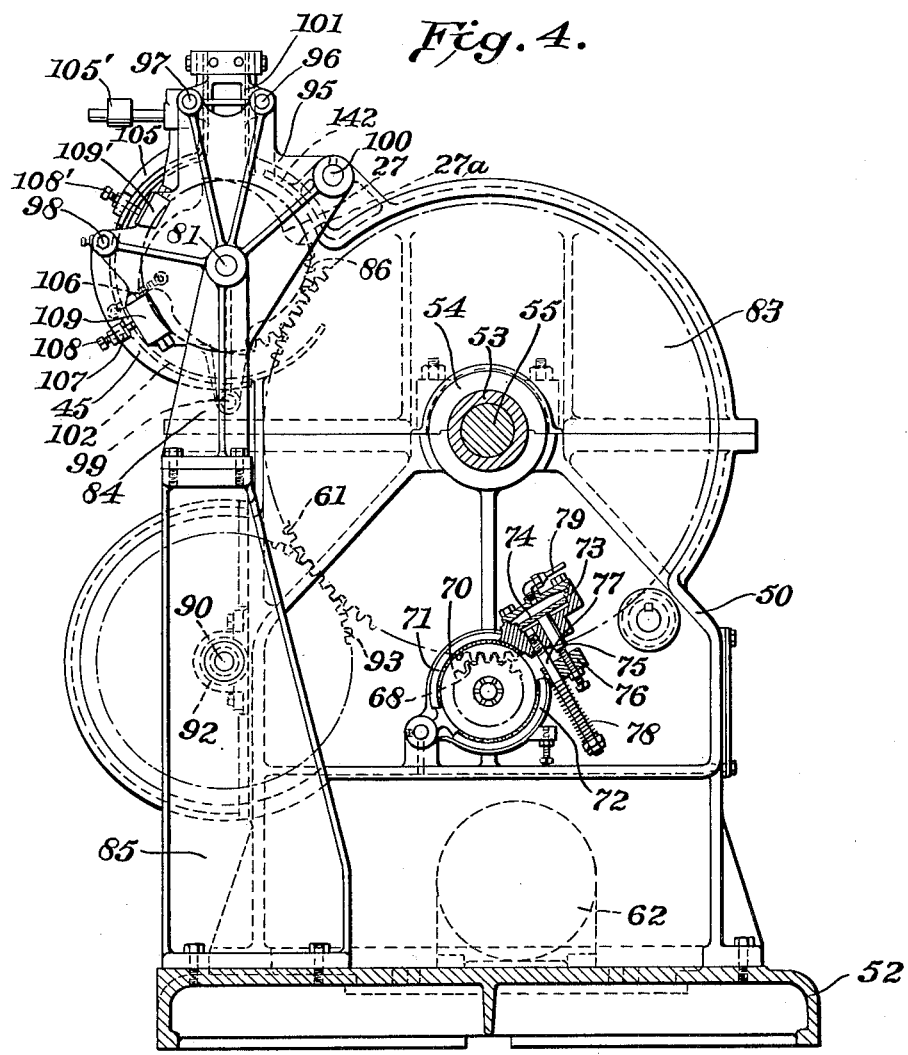
Figure 4 is an elevation and partial section of the supporting framework shown in Figure 3, looking in the opposite direction and with the can supporting turret removed.
Figure 5:
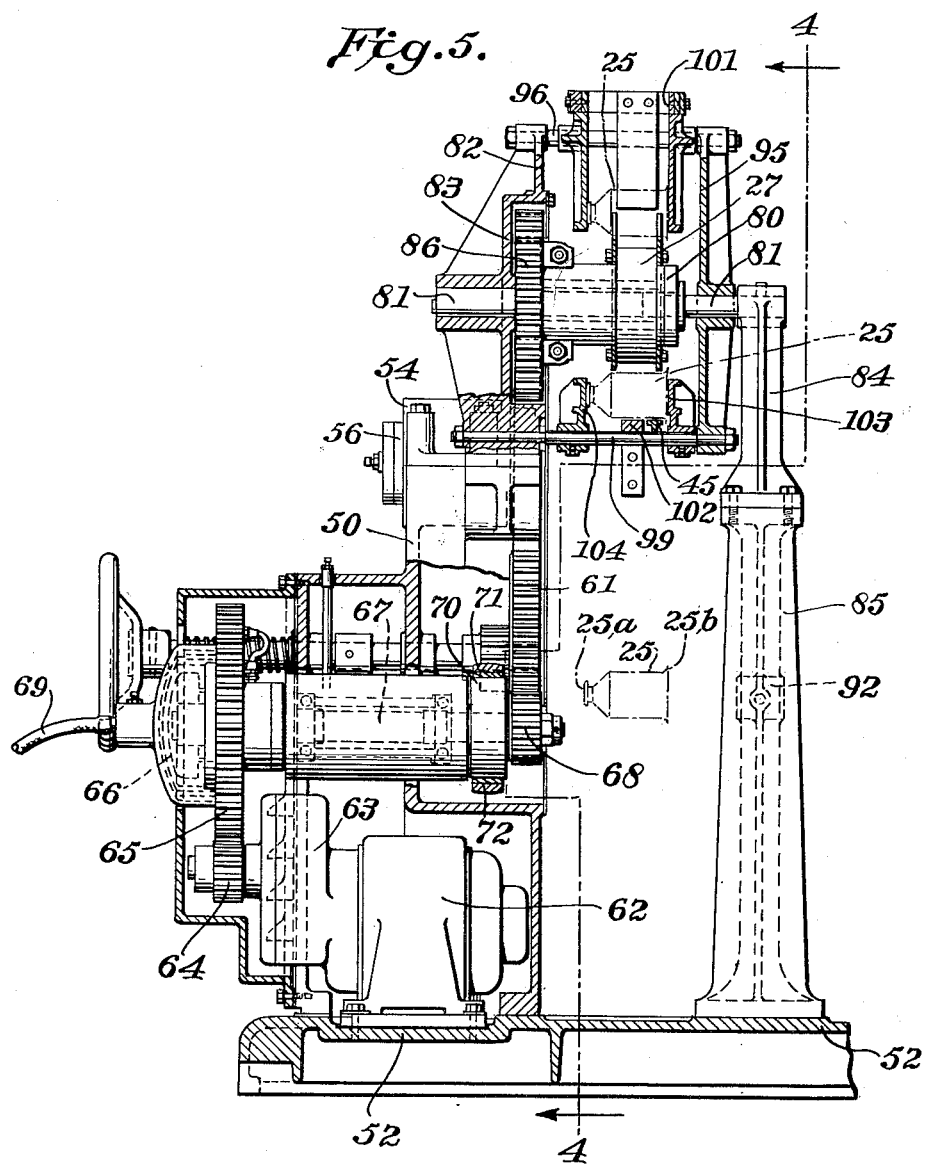
Figure 5 is a vertical longitudinal section at the drive end of the machine, taken through the driving mechanism and with the main turrets removed.
Figure 6:
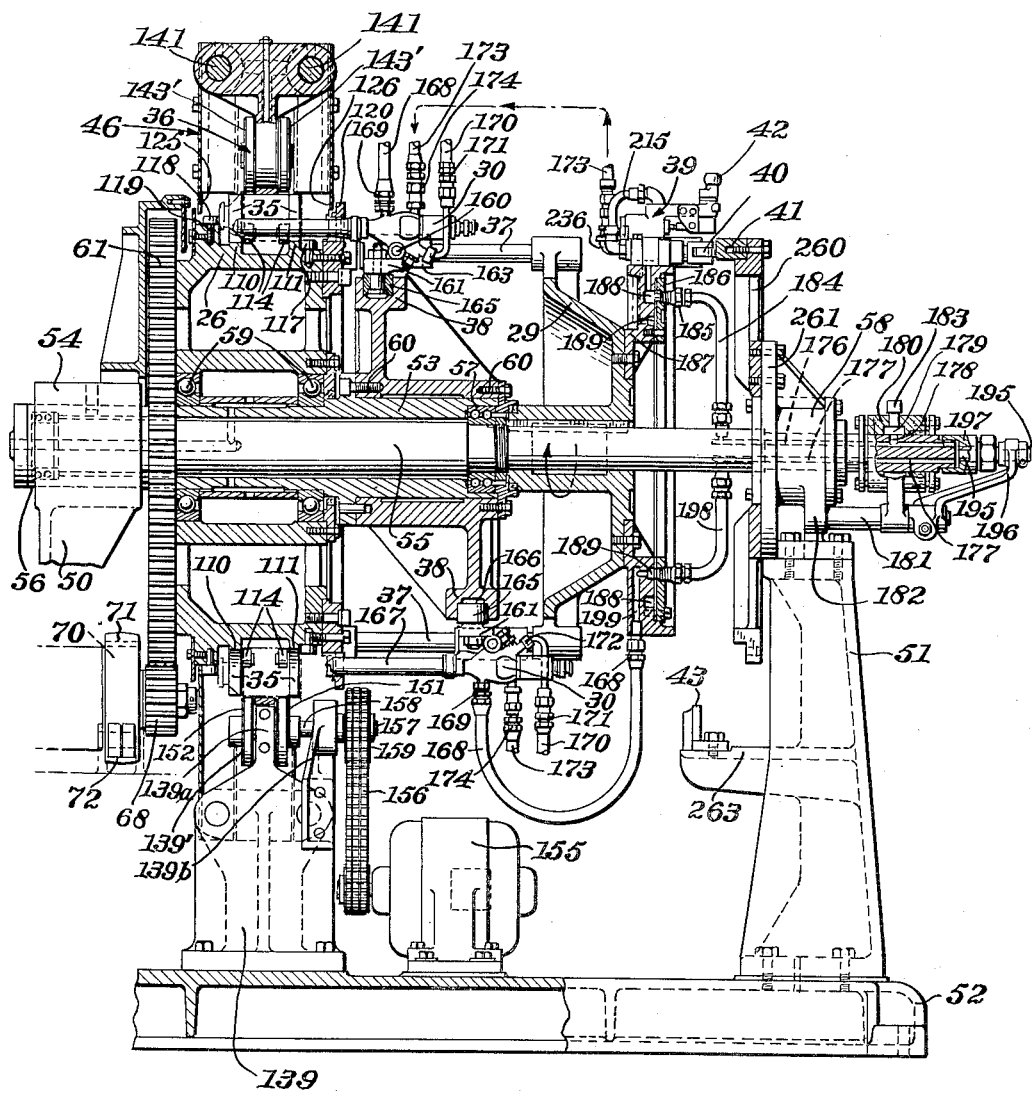
Figure 6 is a vertical longitudinal section taken through the axis of the turrets.

The can receiving pockets are partially closed at their opposite ends by annular flanges 119, 120, respectively, bolted to the end faces of the turret and projecting outwardly as shown in Figures 6 and 18. The flange member 120, positioned opposite the open bottom ends of the containers, is provided with a plurality of apertures 121, one aligned with each can receiving pocket and with the corresponding spray gun on the gun turret. As hereinafter explained, the guns are projected through the openings 121 into the interiors of the cans.

The can enclosing rood and rotating means

The hood 46 (Fig. 1) preferably extends around one side of the periphery of the turret 26 from the uppermost to the lowermost point in the path of rotation thereof. The hood includes side walls 122, 123 projecting radially inwardly toward the axis of rotation of the turret and having substantially semi-circular inner edges 125, 126, disposed closely adjacent the edges of the flanges 119, 120 and forming a substantial seal therewith. The side walls 122, 123 are spaced outwardly from and are supported by a main hood-supporting casting 127, comprising a vertically disposed web 128, an outer marginal flange 129, an inner marginal flange 130 and a base flange 131. It will be noted that the inner marginal flange 130 is concentric with the path of movement of the containers and with the inner edges 125, 126 of the hood side walls. The web 128 substantially divides the interior of the hood into two sections, each of which is connected to a flue piece 132 by an appropriate coupling 133, passages 134, 135 (Fig. 2) being provided for the discharge of air and spray from the coating zone. Top and bottom walls 136, 137 connect the side walls to the central supporting web and complete the hood.

The inner flange 130 supports a pair of outwardly projecting bosses 138, disposed on opposite sides of the web. A special head bracket 140, secured to the upper end of the casting 127 by dowel pins 141, supports a fixed guide 142 which holds the containers in the turret pockets after they leave the infeed dial, and includes a pair of outwardly projecting bosses 143. A foot bracket 139, similarly connected to the lower end of the casting 127 has a boss 139a at its upper end (Fig. 6).

The bosses 138, 143 carry horizontally disposed shafts, upon which sheaves 138', 143' are journalled for rotation. A driven shaft 158, journalled in the boss 139a, carries a pair of sheaves 139' in vertical alignment with the sheaves 138'. A fourth pair of sheaves 144 are journalled upon shafts 145 each carried by one lever of a pair of levers 146, pivoted on a pin 147 carried by the web 128. The other ends of the levers 146 carry blocks 148 slidably mounted on rods 149 pivoted adjacent the base 131 of the casting 127, the levers being urged to swing in a clockwise direction (Fig. 1) by springs 150, surrounding the rods 149 and disposed between the blocks 148 and the lower enlarged ends of the rods.

A pair of parallel V-belts 151, 152 are trained for movement around the several sheaves, as shown in Figure 1, tension being applied to the belts by the two movably mounted sheaves 144. As shown in Figures 1, 6 and 18, one run of each belt is disposed in contact with the side walls of the containers in the turret pockets, as they move through the hood. Hence, the belts maintain the containers in the pockets as they move around underneath the turret. Moreover, the belts, driven by sheaves 139', impart rotation to the containers by frictional contact therewith. The shaft 158, carrying sheaves 139', is also journalled in bearings carried by an upwardly and rearwardly projecting arm 139b, bolted to the foot bracket 139. A sprocket 159, fixed to the inner end of the shaft 158, is connected by a chain 156 to an electric driving motor 155, whereby the belts are driven.

The belts trained about the exteriorly disposed sheaves 143', 139' and tension sheaves 144 are guided into and out of the hood through appropriate entrance and exit openings, not shown. It should be noted that the belts are aligned with and positioned opposite to the rollers 114 in the turret pockets, so that, if no cans are present in the pockets, the belts will be supported by the rollers, instead of by the turret rim.

The spray guns and control means

As pointed out above, the spray guns are slidably mounted for axial movement on the rods 37. Each gun is secured to and carried by a transverse pin 160, having its ends mounted in sockets carried by a carriage 161 and clamped in adjusted position by bolts 162. The carriage 161 has sleeve-like ends 163 slidably mounted upon the rods 37, while a centrally located depending pin 164 carries a cam following roller 165, the roller being disposed in the groove 166 of the stationary cam 38. The cam has forwardly and rearwardly projected portions, as shown in Figure 6, whereby the brackets 161 and the gun supported thereby are reciprocated axially of the turret, as the turret rotates.

Each gun is provided with an elongated nozzle 167, of a diameter small enough to enable it to move through the openings 121 in the turret flange 120 to a point adjacent the neck end of the can bodies in the pockets, as shown in full lines in Figure 18 and to a point disposed exteriorly thereof, as indicated in dotted lines. The structural details of the gun need not be described, since guns of a preferred type are well known. Liquid coating material under relatively low pressure is delivered to each gun, as hereinafter described, through a flexible conduit 168 and a suitable coupling 169. Atomizing air is delivered to each gun by a flexible conduit 170 and fittings 171, 172. In the normal operation of the machine, the atomizing air is constantly flowing, but the gun operation is controlled by the delivery of air through a trigger line comprising a flexible conduit 173 and a suitable coupling 174. The air admitted by the trigger line serves to actuate a piston which controls the needle valve of the gun, in a well known manner, for instance, as explained in the aforesaid application of Goebel and Rau. When air is admitted to the gun through this line, the needle valve is withdrawn to the operative position, thereby permitting a flow of coating material into the vicinity of the atomizing air blast, indicated at 175 in Figure 18.

Referring to Figure 6, the main shaft 55 of the machine is provided with two independent longitudinal bores 176, 177, extending from the right-hand end thereof inwardly a suitable distance. The bore 176 is closed by a plug at its right-hand end, while at an intermediate point it communicates through a radial passage 178 with an angular groove 179 in a stationary air chest 180, sealed externally on the shaft and restrained against rotation by a rod 181 carried by a boss 182 integral with the housing for the bearing 58. Air is delivered to the annular chamber 179 by an appropriate nipple 183 on the chest 180. At its inner end, the bore 176 communicates with a radial pipe 184, the pipe being secured at its outer end to a coupling 185 carried by a face plate 186, bolted to a distributor ring 187, rotatable with the gun turret 29. The distributor ring 187 has a pair of annular concentric grooves 188, 189 formed in the face adjacent the plate 186, the grooves and the plate defining annular distributing chambers. The nipple 185 communicates with the outer chamber 188 and delivers air thereto, from which point the air is conducted to the several guns, as hereinafter explained.

Liquid coating material is delivered to the machine through a stationary nipple 195 clamped against rotation in the end of a bracket 196 carried by the rod 181. The nipple projects into and through a stuffing box 197 carried by the end of the shaft 55 and communicating with the bore 177 in the shaft 55. This inner end of the bore 177 communicates through a radial pipe 198 with the radially inner distributing chamber 189, while the latter delivers coating material through outwardly directed bores 199 to the flexible conduits 168 which lead to the spray guns.

As indicated in Figure 15, the atomizing air is delivered to each gun from the distributing chamber 188 through an outwardly directed bore 200 in the distributor ring, couplings 201 serving as means for connecting the ends of the flexible conduits 170 thereto. Pet cocks 202 may be provided so that these airlines may be manually cut off when the machine is shut down.

Air for each trigger line flows from the distributing chamber 188 outwardly through a radial bore 205 to a chamber 206 (Figs. 13–17) associated with each valve assembly 39. A vertical passage 207 communicates at its lower end with the chamber 206 and at its upper end with an upper, centrally positioned, horizontal bore 208 having a plug 209 disposed in one end and a cap 210 in the other. A valve 211 is urged, by a spring 212, toward a valve seat 213 surrounding an air passage 214 in the plug 209, the passage communicating radially with a conduit 215, leading downwardly to another pair of valves described below.

The valve 211 is normally held in open position by a toggle mechanism connected to the valve stem 216 and comprising a link 217 and a rock arm 218 secured to a rock shaft 219. At its upper end, the rock shaft 219 carries a lever arm 220, upon the end of which the cam following roller 42 is journalled. A stop pin 222, limits the movement of the toggle mechanism in the direction shown in Figures 12 and 16, and maintains the valve 211 in open position. When the cam following roller 42 is swung in a clockwise direction as viewed in Figures 12 and 16, the toggle breaks, thereby permitting the spring 212 to close the valve, as shown in Figure 17. The means for moving the cam follower and the toggle mechanism to the two positions illustrated will be described below.

Normally, the valve is open and air is delivered through the pipe 215 to the first bore of a pair of bores 225, 226 in the body of the valve assembly 39, below the bore 208 and position on opposite sides of the radial bore 207. One end of the bore 225 is closed by a cap 227, while a plug 228 is positioned in the other end. A valve 229 carried by a stem 230 is urged by a spring 231 to a position to close a passage 232 communicating with a transverse bore 233, which bore, at its other end, is in communication with the longitudinal bore 226.

One end of the bore 226 is closed by a cap 235 having a passage therein communicating with a nipple 236 to which the trigger airline 173 is connected by suitable coupling means 237. In the other end of the bore 226, there is a plug 238, having passages 239 communicating with atmosphere and bearing surfaces 240 for the stem 241 of a valve 242, the valve, when urged to closed position by a spring 243, serving to close the passages to atmosphere.

A pair of rearwardly projecting trunnions or bosses 244 are apertured for the reception of a vertically disposed pivot pin 245, to which a valve-operating lever 246 is secured by a set screw or the like, the lever carrying a pair of adjustable screws 247, 248 adapted to contact the valve stems 230, 241, respectively. A tension spring 249 connected at one end to a pin 250 and at its other end to the lever 246, urges the latter to the position shown in Figure 14, wherein the valve 229 is closed and the valve 242 opened, thereby preventing a flow of air from the line 215 to the spray gun, but permitting an exhaust of air from the gun to atmosphere. The other end of the lever is bifurcated, as indicated at 255 and the cam following roller 40 is journalled for rotation on a pin 256 carried thereby.

It will be appreciated from a consideration of the structure shown in Figure 14, that, when the lever 246 is rocked in a counter-clockwise direction, as viewed in that figure, the valve 229 will be opened and the valve 242 closed, thereby establishing a flow of air from the pipe 215 through the bores 225, 232, 233, 226 and thence to the trigger line conduit 173.

As pointed out above, the cam following roller 40 is positioned to engage a stationary cam 41, to control the normal operations of the guns. The cam 41 is supported by a substantially circular bracket 260 (Figs. 6, 7 and 8) secured to a flange 261 associated with the housing for the bearing 58. The cams 41 and 166 are so arranged that the operation of each gun commences after the nozzle thereof has been projected into proximity to the neck of the container and continues until the nozzle has been substantially withdrawn.

As previously mentioned, the stationary cam 43 serves to shift each auxiliary valve 211 to the operative, open position, as shown in Figures 13 and 16, during each revolution of the machine. The cam 43 may be mounted upon a lateral extension 263 of the supporting standard 51. The movable cam assembly is carried by the circular bracket 260, a flange 265 of a casing 266 being bolted thereto. Referring to Figures 7–11, the casing 266 encloses a solenoid 267 having a downwardly projecting armature 268 connected by a link 269 to one arm of a three-arm lever 270, pivoted at 271. Below the casing 266, there is a boss 272 having stop bolts 273, 274 therein, adapted to abut and limit the swing of the lever 270. The upwardly projecting arm 275 of the lever carries the cam plate 44, the cam comprising an angle strip having a web 276 bolted to the arm 275 by bolts 277. A tension spring 278 tends at all times to swing the lever 270 in a clockwise direction, Figs. 7 and 10, thereby shifting the cam 44 to a position out of the path of movement of the rollers 42. When the solenoid is energized, however, by a closing of the switch 109 in the absence of a can in the infeed dial, the armature 268 is drawn upwardly, thereby swinging the lever 270 in a counter-clockwise direction and projecting the cam 44 into the path of movement of the appropriate roller 42, to shift the latter and the associated toggle to valve closing position.

Operation

In the operation of the machine of the present invention, containers in a line are fed downwardly from conventional conveying means into the upper end of the vertical infeed chute 101. The containers are picked up, one by one, by the pockets 27a in the infeed dial 27 and are moved around under the guide 105 and then upon the fixed guide 102, at the end of which they are delivered successively to the pockets 35 in the turret 26. The containers, supported upon the rollers 114 in the pockets, move under the fixed guide 142 and at the end thereof they are successively moved into contact with the belts 130, which are driven in a direction opposite to the movement of the containers. Hence, the latter are rapidly rotated about their axes, as they move through the hood 46. While the cans are rotating in this manner, the guns 30 aligned therewith are successively advanced so that the nozzles 167 thereof are projected into their interiors, in proximity to the neck ends thereof. When the guns have been projected to their limit of movement by the cam 38, they are successively retracted, and at the commencement of or slightly before the retracting movement, the cam 41 shifts the valve operating levers 246 to position to deliver trigger air to the guns, thereby causing a spray of coating material to be projected from the guns over the interior of the rapidly rotating cans. As the end of the nozzles are withdrawn from the cans, the cam 41 shifts the trigger line valves to closed position, thereby cutting off the supply of air in those lines to the guns and permitting the air under pressure in the guns to escape to atmosphere through the passages 239. Hence, the needle valves in the guns are closed and the spray terminated. As the containers leave the belts, they move along upon a stationary guide 139c, supported by the foot bracket 139, until they are deposited in the holders 88 carried by the outfeed chain 87.

In the event that, for one reason or another, a can is not picked up by one or more of the pockets in the infeed dial 27, the movable guide or feeler 45 will be drawn inwardly by the spring 106, closing the circuit in which the switch 109 is included, thereby energizing the solenoid 267. In such case, the solenoid swings the lever 270 in a direction to project the cam plate 44 forwardly into the path of movement of the cam following rollers 42, associated with the auxiliary valves 211 in the trigger airlines. The cam in this position serves to shift the toggle mechanisms from the position shown in Figure 16 to that shown in Figure 17, thereby closing the trigger airlines and preventing the delivery of air by the normal controlling valves 229, 242, under the control of the cam 41. As long as no cans are present, the cam 44 will continue to shift the auxiliary valves to the closed position before the associated guns reach the spraying zone. During each rotation of the turret, however, the toggle mechanism and the auxiliary valves are shifted to the open position. If cans are present in the infeed dial pockets, the valves will remain open and the guns will be operated in the normal manner, but if no cans are present the cam 44 will close the valves. It will be understood that a can moving around in the infeed dial will shift the feeler 45 outwardly and thus open the switch 109, deenergizing the solenoid 267 and permitting the spring 277 to retract the cam 44. As long as cans continue to be fed to the machine by the infeed dial, the feeler remains in the outwardly projected position and the switch 109 remains open.

It should be noted that the movable cam assembly is positioned to operate upon the valve mechanism associated with the gun for the particular turret pocket that would normally receive a container from the pocket 27a of the infeed dial which, at that moment, is opposite the feeler 45. Hence, the feeler and the devices controlled thereby serve to render inoperative the particular gun which is aligned with a pocket that has, or will have, no can therein.

It must be understood that this invention is not limited to the specific details of construction shown in the accompanying drawings and described above, but covers all devices coming within the scope of the appended claims and their equivalents.

We claim:

1. A can coating machine comprising a rotatably mounted turret having peripheral pockets adapted to receive cans with their axes parallel to the turret axis, said turret having end walls terminating in continuous circular margins projecting radially outwardly beyond the bottoms of the pockets, a stationary hood enclosing a portion of the periphery of the turret and having side walls projecting inwardly toward the turret axis and defined by inner arcuate edges positioned closely adjacent the margins of said turret end walls, means for rotating the cans about their axes in said pockets during their movement through the hood, and means for projecting coating material into the interiors of the cans during the last-mentioned movement.

2. A can coating machine comprising a rotatably mounted turret having peripheral pockets adapted to receive cans with their axes parallel to the turret axis, said turret having end walls terminating in continuous circular margins projecting radially outwardly beyond the bottoms of the pockets, a stationary hood enclosing a portion of the periphery of the turret and having side walls projecting inwardly toward the turret axis and defined by inner arcuate edges positioned closely adjacent the margins of said turret end walls, means for rotating the cans about their axes in said pockets during their movement through the hood, a plurality of spray guns mounted for rotation with the turret and for axial movement relative to the pockets, means for moving the guns axially into the interiors of the cans in the pockets during their movement through the hood, and means for projecting coating material from the guns when in the last-mentioned position.

3. A can coating machine comprising a rotatably mounted turret having peripheral pockets adapted to receive cans with their axes parallel to the turret axis, said turret having end walls projecting radially outwardly beyond the bottoms of the pockets, one of said end walls being shaped to provide an opening at one end of each pocket, a stationary hood enclosing a portion of the periphery of the turret and having side walls defined by edges positioned closely adjacent the turret end walls, means for rotating the cans about their axes in said pockets during their movement through the hood, a plurality of spray guns mounted for rotation with the turret and for axial movement relative to the pockets, and means for projecting the guns through said openings into coating relation to the interiors of the cans in the pockets.

4. A can coating machine comprising a rotatably mounted turret having peripheral pockets adapted to receive cans with their axes parallel to the turret surface, said turret having end walls projecting radially outwardly beyond the bottoms of the pockets, one of said end walls being shaped to provide an opening at one end of each pocket, a stationary hood enclosing a portion of the periphery of the turret and having side walls defined by edges positioned closely adjacent the peripheries of the turret end walls, means for rotating the cans about their axes in said pockets during their movement through the hood, a plurality of spray guns mounted for rotation with the turret and for axial movement relative to the pockets, stationary cam means for projecting the guns through said openings into coating relation to the interiors of the cans, and additional cam means for controlling the operations of said guns.

5. In a can coating machine, a can-receiving turret journalled for rotation on a horizontal axis, a plurality of can-holding pockets on the circumference of the turret adapted to receive cans with their axes parallel to the axis of rotation of the turret, radially outwardly projecting flanges carried by the turret spaced axially from the ends of the containers in the pockets and at least partially closing the pockets, a stationary housing including walls terminating adjacent said flanges and substantially completely enclosing the containers in the pockets, one of said flanges being provided with apertures aligned with said pockets, a plurality of spray guns mounted for rotation with the turret, and means for projecting the spray guns through the apertures into operative relation to coat the containers in the pockets.

6. A can coating machine comprising a can turret rotatable about a horizontal axis, a spray gun supporting turret aligned therewith and rotatable about said axis, a plurality of spray guns carried by the latter turret for axial movement relative to the first turret, a stationary cam between said turrets, cam following means associated with said guns for moving the same axially, driving means for rotating one turret, and means for transmitting rotation from that turret to the other comprising means directly connecting the two turrets together for rotation in unison and disposed radially outwardly of said intermediate stationary cam and bridging the space between the turrets.

7. A can coating machine comprising a horizontally disposed shaft, a stationary sleeve surrounding a portion of the shaft and in which the shaft is journalled, a turret journalled for rotation upon said sleeve, a second turret fast on the shaft and rotatable therewith, a stationary cam track carried by said sleeve between said turrets, means for rotating one of said turrets, means disposed radially outwardly of said stationary cam and connecting the turrets together for rotation in unison, a plurality of spray guns carried by said connecting means for axial movement relative to the turrets, and cam following means carried by said guns and engaging said cam for moving the guns axially during rotation of the turrets.

8. A can coating machine comprising a pair of spaced coaxially aligned turrets mounted for rotation about a horizontal axis, a plurality of horizontally disposed peripheral pockets on one turret, a stationary cam between the turrets, a plurality of rods interconnecting the turrets, a plurality of spray guns aligned with said pockets and slidably mounted on said rods, and cam following means associated with the guns and engaging said cam for moving the guns axially relative to the pockets during rotation of the turrets.

9. A can coating machine comprising a pair of spaced coaxially aligned turrets mounted for rotation about a horizontal axis, a plurality of horizontally disposed peripheral pockets on one turret, a stationary cam between the turrets, a plurality of rods interconnecting the turrets, a plurality of spray guns aligned with said pockets and slidably mounted on said rods, cam following means associated with the guns and engaging said cam for moving the guns axially relative to the pockets during rotation of the turrets, a control valve for each of said guns rotatable with said turrets, a second stationary cam and cam following means associated with the valves engaging the latter cam for controlling the operations of the guns.

10. A can coating machine comprising a pair of spaced, coaxially aligned turrets rotatable about a horizontal axis, a plurality of substantially parallel rods connecting the turrets for rotation in unison, spray guns slidably mounted for axial movement on said rods, a stationary cam disposed inwardly thereof, cam following means between the guns and said cam for moving the guns, a spray gun control valve for each gun carried by one turret, and a second stationary cam positioned axially beyond that turret for controlling said valves.

11. A can coating machine comprising a turret mounted for rotation about a horizontal axis, a plurality of horizontally disposed can-receiving pockets on the periphery of the turret having rollers journalled for rotation adjacent the bottoms of the pockets and adapted to engage and support the cylindrical side walls of the cans positioned therein and additional rollers at opposite ends of the pockets journalled for rotation on radial axes to engage the ends of the cans to prevent substantial axial movement thereof, whereby the cans may rotate in the pockets, belt means trained to follow the path of movement of the cans from a point on the upper periphery of the turret to a point on the lower periphery thereof and engaging the side walls of the cans opposite the first-mentioned rollers, tension means for the belt means to urge the belt toward the cans and to hold the cans in the pockets against the rollers, and means for driving said belt means to rotate the cans.

12. In a can coating machine, a can holding turret mounted for rotation about a horizontal axis, a plurality of can-receiving pockets in said turret having two pairs of rollers positioned adjacent the bottoms thereof to engage and rotatably support the can bodies at opposite ends thereof at circumferentially spaced points, and a pair of radially journalled rollers at opposite ends of the pockets to engage the ends of the containers and prevent axial movement thereof, a pair of parallel belts trained for movement in contact with the side walls of the can bodies in the pockets on lines opposite the first-mentioned pairs of rollers, whereby, in the absence of cans in the pockets, the belts will engage the rollers, and means for driving the belts to rotate the cans in the pockets.

13. In a can coating machine comprising movable can-holding means and spray guns movable therewith, control means for rendering the guns inoperative in the absence of cans in the holding means, said control means comprising a shiftable cam following control element movable with each gun and adapted to assume an operative position and an inoperative position, a fixed cam positioned adjacent the path of movement of said control elements to shift each of said elements to one position during each cycle of movement of each gun, a movable cam positioned behind the fixed cam adjacent said path of movement, and means controlled by the absence of cans for moving the movable cam into the path of movement of said control elements to shift said cam following control elements to the other position.

14. In a can coating machine comprising movable can-holding means and spray guns movable therewith, control means for rendering the guns inoperative in the absence of cans in the holding means, said control means comprising a shiftable cam following control element movable with each gun and adapted to assume an operative and an inoperative position position, a fixed cam positioned adjacent the path of movement of the cam following control elements to shift each of said elements to one position during movement of the guns, a movable cam positioned adjacent said path of movement of the elements and spaced beyond the fixed cam, a can feeler mounted for movement between two positions depending upon the presence or absence of cans in operative relation thereto, and means controlled by the position of said feeler for moving the movable cam into position to shift the cam following control element to the other position.

15. In a can coating machine comprising movable can-holding means and spray guns movable therewith, control means for rendering the guns inoperative in the absence of cans in the holding means, said control means comprising a shiftable cam following control element movable with each gun and adapted to assume an operative and an inoperative position, a fixed cam positioned adjacent the path of movement of said elements and shaped to shift each of said elements to one position during the movement of the guns, a movable cam positioned adjacent said path of movement of the elements and spaced beyond the fixed cam, a solenoid for moving said movable cam into the path of movement of the elements to shift each of said elements to the other position, a can feeler and an electric circuit controlled by said feeler for operating said solenoid in the absence of cans in the holding means.

16. In a can coating machine comprising a rotatable can-holding turret, spray guns movable with the turret and aligned with cans thereon, and infeed means for delivering cans to the turret, control means for rendering the guns inoperative in the absence of cans in the turret, said control means comprising a shiftable cam following control element movable with each gun and adapted to assume an operative and an inoperative position, stationary cam means for shifting each control element to operative position during each rotation of the turret, a movable cam positioned adjacent the path of movement of the elements and beyond the fixed cam, and means for projecting the movable cam into the path of movement of said elements to shift the latter to the inoperative position in the absence of cans.

17. In a can coating machine comprising a rotatable can-holding turret, spray guns movable with the turret and aligned with cans thereon, and infeed means for delivering cans to the turret, control means for rendering the guns inoperative in the absence of cans in the turret, said control means comprising a shiftable cam following control element movable with each gun and adapted to assume an operative and an inoperative position, stationary cam means for shifting each control element to operative position during each rotation of the turret, a movable cam, means for projecting the movable cam into the path of movement of said elements to shift the latter to the inoperative position in the absence of cans, the last-mentioned means comprising a can feeler adjacent said infeed means, and means controlled by the position of said feeler for moving the cam.

18. In a can coating machine comprising a rotatable can-holding turret, spray guns movable with the turret and aligned with cans thereon, and infeed means for delivering cans to the turret, control means for rendering the guns inoperative in the absence of cans in the turret, said control means comprising a shiftable cam following control element movable with each gun and adapted to assume an operative and an inoperative position, stationary cam means for shifting each control element to operative position during each rotation of the turret, a movable cam, means for projecting the same into the path of movement of said elements to shift the latter to the inoperative position in the absence of cans, said last-mentioned means comprising a feeler adjacent said can infeed means movable between two positions depending upon the presence or absence of cans therein, and means actuated by the movement of the feeler for moving said cam.

19. A can coating machine comprising a rotatable turret having a plurality of can receiving pockets associated therewith, a plurality of spray guns mounted for rotation with the turret and aligned with the pockets, air and coating material lines leading to each gun, and means for rendering each gun inoperative when no can is present in the corresponding pocket, said means comprising a valve in each air line, a cam following control element for each valve mounted for rotation with each gun, a movable cam adjacent the path of movement of said elements, and means for projecting the cam into the path of movement thereof to shift the elements to valve closing position when no can is present.

20. A coating machine comprising means for moving a plurality of cans along a predetermined path including a coating zone, spray guns movable with the cans through at least a portion of their movement and including the portion through the coating zone, an air line leading to each gun and movable therewith, valve means in each air line, a fixed cam for normally opening each valve means to operate the associated gun, a movable cam positioned in advance of the first cam and movable into a position to shift the valve means to a closed position wherein the first cam is ineffective to open the same, and means controlled by the absence of a can from the normal position in the can moving means at a point in advance of the coating zone for projecting the movable cam to the last-mentioned position, thereby to so close the valve means.

21. A coating machine comprising means for moving a plurality of cans along a predetermined path including a coating zone, spray guns movable with the cans through at least a portion of their movement and including the portion through the coating zone, an air line leading to each gun and movable therewith, valve means in each air line, a fixed cam for normally opening e´ valve to operate the associated gun, a movable cam positioned in advance of the first cam and movable into a position to shift the valve means to a closed position wherein the first cam is ineffective to open the same, a can feeler positioned adjacent the path of movement of the cans at a point in advance of the coating zone and movable to an operative position in the absence of cans at that point, and means controlled by the movement of said feeler to that position for projecting the movable cam to the last-mentioned position, thereby to render ineffective the gun which normally would move with a can at that point on the can moving means.

22. A can coating machine comprising a rotatable turret having can receiving pockets in its periphery, spray guns aligned with the pockets and rotatable therewith, an infeed dial having pockets adapted to register with the turret pockets and deliver cans thereto, a can feeler adjacent the infeed dial and movable to an operative position when cans are not present in the pockets thereof, and means controlled by the movement of said can feeler to the operative position for rendering inoperative the spray gun associated with the pocket of the turret which normally would receive a can from that infeed pocket.

23. A can coating machine comprising a rotatable turret having can receiving pockets in its periphery, spray guns aligned with the pockets and rotatable therewith, an infeed dial having pockets adapted to register with the turret pockets and deliver cans thereto, control means for the spray guns including a cam follower associated with each gun, a movable cam positioned adjacent the path of movement of the cam followers, a can feeler adjacent the infeed dial, and means controlled by the can feeler in the absence of a can in a pocket in the infeed dial for projecting the movable cam to a position to shift the cam follower to render inoperative the gun aligned with the pocket in the turret that normally would have received a can from said pocket of the infeed dial.

24. A can coating machine comprising a rotatable turret having can receiving pockets in its periphery, spray guns aligned with the pockets and rotatable with said turret, an air line leading to each gun and control means for each line rotatable with the guns, said control means each comprising valve means adapted in one position to deliver air through the line to the gun and in the other position to exhaust air from the gun to atmosphere, a normally open supplemental valve in the line, and means for closing the same to prevent the delivery of air to the gun by the first-mentioned valve means in the absence of a can in the associated pockets, the last-mentioned means comprising a stationary cam for opening the supplemental valve, a second cam movable to a position to close that valve, and means controlled by the absence of a can for moving the second cam to that position.

25. A can coating machine comprising a rotatable turret having a plurality of spray guns mounted thereon, air and coating material lines leading to each gun, air flow controlling means in each line to control the operation of the associated gun comprising a normally open valve and a normally closed valve in series, a stationary cam track adjacent the path of movement of the valves, a cam follower associated with the normally closed valve for opening the latter to deliver air to the gun, a movable cam positioned adjacent the path of movement of the valves, a cam follower associated with the normally open valve, and means for projecting the movable cam into the path of movement of the last-mentioned follower to close the normally open valve.

26. A can coating machine comprising a rotatably mounted can-holding turret, a plurality of spray guns rotatable therewith, an operating air line leading to each gun, and control means for each line mounted for rotation with the guns, said control means comprising a normal air delivery valve, a cam follower associated therewith for opening the valve, a stationary cam for opening the valve, an auxiliary normally open, line closing valve, a two-position toggle mechanism for operating the valve, a cam follower for controlling the toggle mechanism, a stationary cam positioned adjacent the path of movement of the last-mentioned cam follower and adapted to be engaged thereby to shift the toggle to valve opening position, and a movable cam positioned adjacent said path of movement and adapted to be projected into a position to be engaged by the second-mentioned cam follower to shift the toggle mechanism to valve closing position.

WILTIE I. GLADFELTER.
WALTER A. EHRLICH.